United States Patent
Shimizu et al.

(10) Patent No.: US 8,507,036 B2
(45) Date of Patent: Aug. 13, 2013

(54) PROCESS FOR PRODUCING RIGID OPEN-CELL FOAM

(75) Inventors: Katsuhiko Shimizu, Tokyo (JP); Hiroshi Wada, Tokyo (JP); Yoshinori Toyota, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 13/526,162

(22) Filed: Jun. 18, 2012

(65) Prior Publication Data

US 2012/0251727 A1 Oct. 4, 2012

Related U.S. Application Data

(63) Continuation of application No. PCT/JP2010/072679, filed on Dec. 16, 2010.

(30) Foreign Application Priority Data

Dec. 18, 2009 (JP) .................... 2009-287661

(51) Int. Cl.
B05D 1/02 (2006.01)

(52) U.S. Cl.
USPC ........ 427/243; 427/244; 427/373; 427/385.5; 427/421.1; 427/427.4

(58) Field of Classification Search
None
See application file for complete search history.

(56) References Cited

U.S. PATENT DOCUMENTS

| | | | | |
|---|---|---|---|---|
| 3,091,551 A | * | 5/1963 | Robertson | 427/426 |
| 5,262,447 A | * | 11/1993 | Tucker | 521/125 |
| 5,318,997 A | * | 6/1994 | Okada et al. | 521/174 |
| 6,602,450 B1 | * | 8/2003 | Sato et al. | 264/46.5 |
| 2007/0259981 A1 | * | 11/2007 | Eling et al. | 521/99 |
| 2009/0234036 A1 | | 9/2009 | Shimizu et al. | |
| 2009/0234038 A1 | | 9/2009 | Wada et al. | |
| 2010/0076104 A1 | * | 3/2010 | Wibaux et al. | 521/175 |
| 2011/0060063 A1 | | 3/2011 | Yabuno et al. | |

FOREIGN PATENT DOCUMENTS

| | | |
|---|---|---|
| JP | 57-139120 | 8/1982 |
| JP | 6-25375 | 2/1994 |
| JP | 9-194561 | 7/1997 |
| JP | 2001-342237 | 12/2001 |
| JP | 2004-91643 | 3/2004 |
| JP | 2004-137492 | 5/2004 |
| JP | 2006-241196 | 9/2006 |
| JP | 2007-9101 | 1/2007 |
| JP | 2008-517115 | 5/2008 |
| JP | 2010-516886 | 5/2010 |

OTHER PUBLICATIONS

International Search Report issued Mar. 22, 2011 in PCT/JP2010/072679 filed Dec. 16, 2010.

* cited by examiner

*Primary Examiner* — Erma Cameron
(74) *Attorney, Agent, or Firm* — Oblon, Spivak, McClelland, Maier & Neustadt, L.L.P.

(57) ABSTRACT

To provide a process capable of producing a light-weight rigid open-cell foam by a spraying method using mainly or solely water as a blowing agent, wherein a polyol system liquid is excellent in storage stability even when the blowing agent is used in a large amount, and the foam is excellent in dimensional stability without sagging and capable of forming a uniform thermal insulation layer having an excellent appearance for the purpose of constructing a whole constructions.

16 Claims, No Drawings

US 8,507,036 B2

PROCESS FOR PRODUCING RIGID OPEN-CELL FOAM

This application is a continuation of PCT/JP2010/072679, filed Dec. 16, 2010, and which claims priority to Japanese application no. 2009-287661, filed Dec. 18, 2009.

TECHNICAL FIELD

The present invention relates to a process for producing a rigid open-cell foam by a spraying method.

BACKGROUND ART

It has been widely practiced to react a polyol compound and a polyisocyanate compound in the presence of a blowing agent, etc. to produce a rigid polyurethane foam or a rigid polyurethane urea foam (which may be hereinafter generally referred to as a rigid foam). Foamed states of such rigid foams are generally classified into two categories of open-cells and closed-cells. In the open-cells, individual foamed cells are communicated with one another, and a rigid foam having many open-cells is excellent in the dimensional stability and is used for civil engineering work or as a thermal insulating material for buildings or building materials.

Various compounds are known as blowing agents to be used for producing rigid open-cell foams. Heretofore, as a blowing agent, a low boiling point fluorinated compound has been mainly used. However, such a low boiling point fluorinated compound has a problem of accelerating the global warming, if it is present in the atmosphere. Therefore, a technique has been proposed to use water as a blowing agent as much as possible thereby to reduce the amount of the fluorinated compound to be used (e.g. Patent Documents 1 to 3).

In a case where water is used as a blowing agent so much, the storage stability of the mixed liquid (hereinafter referred to as the polyol system liquid) prepared by mixing the raw material polyol compound with water, catalyst, etc. tends to deteriorate. Accordingly, when it is foamed, the foamed state of the foam is likely to be non-uniform. Especially, in the case of a spraying method, depending upon the site to be sprayed, independence of foamed cells, the cell size, etc. tend to be different, or partial shrinkage or depression of the foam is likely to occur, thus leading to adverse effects to the physical properties or the appearance.

Further, in the application to buildings or building materials, reduction of the weight of rigid foams is desired. As a means to reduce the weight, it is desired to use a blowing agent as much as possible. However, as the amount of water to be used as a blowing agent increases, the above-mentioned problem of deterioration in the storage stability of the polyol system liquid, a problem of deterioration in the compatibility between the polyol system liquid and the liquid containing a polyisocyanate compound (which may also be referred to as the polyisocyanate liquid), or a problem of mixing deficiency, is likely to appear more distinctly. That is, it is very difficult to accomplish the weight reduction while maintaining the physical properties and appearance. Especially in a spraying method for on-site foaming (a practical method for reacting the polyol system liquid and the polyisocyanate liquid while spraying them onto a substrate surface) wherein it is required to increase the reactivity, it has been difficult to constantly produce a rigid foam which is light in weight and has open-cells. Further, in thermal insulation work, not only horizontal or downward spraying to walls or floors, but also upward spraying to ceiling is required. In a spraying method, the reactive raw material-mixed liquid is reacted after sprayed in a liquid state on a substrate. If the speed until the liquid mist undergoes foaming increases, there will be a problem that the foam will hang down like ice pillars.

Patent Documents 1 and 2 propose a method for producing a rigid open-cell foam by foaming with water by using a polyol mixture of a low molecular weight polyol and a high molecular weight polyol. However, the amount of water used here is relatively small, and no consideration is made about the problem with respect to the storage stability of the polyol system liquid attributable to the formulation of the water blowing agent.

Patent Document 3 discloses a method for producing a low density rigid open-cell polyurethane foam by foaming with water by means of slab foaming. This method is a method for producing a rigid open-cell polyurethane foam by using water and using a polyether polyol (a) having an average number of functionality of from 2.5 to 4 and a hydroxy value of from 200 to 300 mgKOH/g, a polyether polyol (b) having an average number of functionality of from 4 to 6 and a hydroxy value of from 400 to 900 mgKOH/g and a polyether polyol (c) having an average number of functionality of from 2.5 to 3.5 and a hydroxy value of from 20 to 60 mgKOH/g in combination.

Patent Document 3 discloses a production method by means of a slab-foaming process, but discloses nothing about a spraying method wherein a high reactivity is required. No consideration is made also with respect to the problems of the surface property and sagging of the foam in a case where a spraying method is applied to a house, and no process is disclosed which makes it possible to form a uniform thermal insulation layer. In the urethane-foaming method such as a slab-foaming or injection method, it is possible to freely determine the mixing ratio of the polyol system liquid to the polyisocyanate liquid, but in the case of a spraying method, usually, there is a restriction such that the mixing ratio is about 1:1 by volume ratio. In a case where water is used in a large amount for the purpose of weight reduction, foaming is carried out under such a restriction and therefore, formulation for e.g. a slab-foaming process is not useful as reference. Further, no consideration is made about the storage stability of the system liquid. The slab-foaming process is carried out usually in a building, and the polyol system liquid is used up in a short period of time. Therefore, no consideration is required for the storage stability of the liquid. On the other hand, the spraying method is carried out outdoors in many cases, and the polyol system liquid is stored under various conditions and therefore is required not to undergo separation for at least about one month.

PRIOR ART DOCUMENTS

Patent Documents

Patent Document 1: JP-A-6-25375
Patent Document 2: JP-A-2001-342237
Patent Document 3: JP-A-2004-91643

DISCLOSURE OF INVENTION

Technical Problem

The present invention has been made in view of the above situations, and it is an object of the present invention to provide a process capable of producing a light-weight rigid open-cell foam by a spraying method using mainly or solely water as a blowing agent, wherein a polyol system liquid is excellent in storage stability even when the blowing agent is used in a large amount, and the foam is excellent in dimensional stability without sagging and capable of forming a uniform thermal insulation layer having an excellent appearance for the purpose of constructing a whole house.

Solution to Problem

The present invention provides the following [1] to [12].

[1] A process for producing a rigid open-cell foam, which comprises mixing and spraying onto a substrate, by a spraying method, a liquid component (X) which comprises a polyol (P), a blowing agent, a surfactant and a catalyst, and a liquid component (Y) which comprises a polyisocyanate compound, and subjecting the mixture on the substrate to foaming and a reaction for curing, wherein the polyol (P) comprises the following polyols (A), (B) and (C), and based on the entire amount of the polyol (P), the content of the polyol (A) is from 45 to 80 mass %, the content of the polyol (B) is from 10 to 40 mass %, the content of the polyol (C) is from 5 to 30 mass %, and the total content of the polyols (A), (B) and (C) is from 90 to 100 mass %, and as the blowing agent, water is used, polyol (A): a polyol that has a hydroxy value of from 100 to 900 mgKOH/g, obtainable by ring-opening addition of an alkylene oxide to an initiator (S1) that contains no nitrogen atom and has from 2 to 8 functionality, or a polyhydric alcohol that contains no nitrogen atom and has from 2 to 8 functionality and a hydroxy value of from 100 to 900 mgKOH/g, polyol (B): a polyol that has a hydroxy value of from 20 to 56 mgKOH/g and a terminal oxyethylene group content of from 5 to 15 mass %, obtainable by ring-opening addition of an alkylene oxide other than ethylene oxide, to an initiator (S2) that contains no nitrogen atom and has from 2 to 8 functionality, followed by ring-opening addition of ethylene oxide, polyol (C): a polyol that has a hydroxy value of from 50 to 350 mgKOH/g, obtainable by ring-opening addition of ethylene oxide and an alkylene oxide other than ethylene oxide, to an initiator (S3) that contains nitrogen atom(s) and has from 3 to 5 functionality, wherein the amount of ethylene oxide based on the entire amount of the alkylene oxide is from 30 to 80 mass %.

[2] The process for producing a rigid open-cell foam according to [1], wherein the liquid components (X) and (Y) are mixed in such a ratio that the isocyanate index becomes from 20 to 100.

[3] The process for producing a rigid open-cell foam according to [1] or [2], wherein the liquid component (X) further contains a flame retardant.

[4] The process for producing a rigid open-cell foam according to any one of [1] to [3], wherein the amount of the water is from 15 to 30 parts by mass per 100 parts by mass of the polyol (P).

[5] The process for producing a rigid open-cell foam according to any one of [1] to [4], wherein as the blowing agent, only water is used.

[6] The process for producing a rigid open-cell foam according to any one of [1] to [5], wherein the initiator (S3) is a compound that contains at least two nitrogen atoms.

[7] The process for producing a rigid open-cell foam according to any one of [1] to [6], wherein the initiator (S3) is an amine compound.

[8] The process for producing a rigid open-cell foam according to any one of [1] to [7], wherein the polyol (C) is a polyol obtainable by ring-opening addition of ethylene oxide to the initiator (S3), followed by ring-opening addition of an alkylene oxide other than ethylene oxide.

[9] The process for producing a rigid open-cell foam according to any one of [1] to [8], wherein the polyol (A) has an oxyethylene group content of from 0 to 5 mass %.

[10] The process for producing a rigid open-cell foam according to any one of [1] to [9], wherein the alkylene oxide other than ethylene oxide to be used in the production of the polyols (A), (B) and (C) is propylene oxide for each polyol.

[11] The process for producing a rigid open-cell foam according to any one of [1] to [10], wherein the volume percentage of closed cells of the rigid foam is at most 10%.

[12] The process for producing a rigid open-cell foam according to any one of [1] to [11], wherein the substrate is a building or a building material.

Advantageous Effects of Invention

According to the present invention, it is possible to produce a light-weight rigid open-cell foam excellent in dimensional stability and appearance by a spraying method using mainly or solely water as a blowing agent, wherein a polyol system liquid is excellent in storage stability even when the blowing agent is used in a large amount.

DESCRIPTION OF EMBODIMENTS

The present invention provides a process for producing a rigid foam having an open-cell nature. The open-cell nature means that closed-cells are little. A rigid open-cell foam to be produced in the present invention is a rigid foam having a volume percentage of closed cells of at most 30%. As the rigid foam having an open-cell nature to be produced in the present invention, a rigid foam having a volume percentage of closed cells of at most 20% is preferred, and a rigid foam having a volume percentage of closed cells of at most 10% is particularly preferred. By making the rigid foam to have a high open-cell nature (i.e. a low volume percentage of closed cells), a merit of improving the dimensional stability is obtainable. The volume percentage of closed cells is a value to be measured in accordance with ASTM D2856.

In the present invention, an alkylene oxide is a hydrocarbon compound having one epoxy group. The number of carbon atoms in the alkylene oxide is preferably from 2 to 8, particularly preferably from 2 to 4. A specific alkylene oxide may, for example, be ethylene oxide, propylene oxide, 1,2-epoxybutane, 2,3-epoxybutane or styrene oxide. As an alkylene oxide other than ethylene oxide, propylene oxide is particularly preferred.

By reacting an alkylene oxide to an active hydrogen atom in an initiator (such as a hydrogen atom of a hydroxy group or a hydrogen atom bonded to a nitrogen atom), the alkylene oxide undergoes ring-opening addition to form a polyol having an oxyalkylene group. By ring-opening addition of one molecule of an alkylene oxide to an active hydrogen atom to form a hydroxy alkyl group, and then, to such a hydroxy group, an alkylene oxide is added by ring-opening addition, and such a reaction is repeated to form a chain of oxyalkylene groups.

A foam tends to have an open-cell nature when polyols having substantially different hydroxy values are used in combination, like in the combination of a polyol having a high hydroxy value such as the polyol (A) or (C) and a polyol having a low hydroxy value such as the polyol (B) in the present invention. The reason for such a phenomenon is considered to be as follows. Due to the difference in the molecular weight or in the terminal hydroxy group being primary or secondary, the reaction rates of the polyols are substantially different, thus resulting in mismatching of the reaction rates. Thus in formation of a resin, a strain is thereby caused to rupture cell films.

Further, by the combination of the polyols (A) and (C) and the polyol (B), it is possible to accomplish good storage stability of the polyol system liquid, and a good open-cell nature and good appearance of the sprayed foam, by optimizing the oxyethylene group content in the polyol (B) in a case where the amount (parts) of water added is large. Further, by using the polyol (C), it becomes possible to satisfy both the storage stability and improvement of the activity, and it becomes possible to form a uniform thermal insulation layer with little sagging.

The rigid open-cell foam of the present invention is produced by mixing and spraying onto a substrate, by a spraying method, a liquid component (X) which comprises a polyol (P) comprising polyols (A), (B) and (C), a blowing agent, a surfactant and a catalyst, and a liquid component (Y) which comprises a polyisocyanate compound, and subjecting the mixture on the substrate to foaming and a reaction for curing. Here, the liquid component (X) is a component which is also called the above-mentioned polyol system liquid, and the liquid component (Y) is a component which is also called the above-mentioned polyisocyanate liquid.

[Liquid Component (X)]

The liquid component (X) in the present invention is a liquid component (X) which comprises a polyol (P), a blowing agent, a surfactant and a catalyst. In a case where a component other than the blowing agent, the surfactant and the catalyst, such as a flame retardant, is to be used, such a component is also usually incorporated to the liquid component (X). A component which is not reactive with an isocyanate group may be incorporated to the liquid component (Y), but is usually incorporated to the liquid component (X), since the viscosity of the polyisocyanate compound is high.

The liquid component (X) contains the polyols (A), (B) and (C) and may further contain another compound having an active hydrogen atom reactive with an isocyanate group. Such a compound having an active hydrogen atom, such as a polyamine or a polyol other than the polyols (A), (B) and (C) will be hereinafter referred to as an active hydrogen compound (D). However, in the present invention, water is not regarded as an active hydrogen compound (D), although water is reactive with an isocyanate group.

The polyol (P) in the present invention is a collective term for the above polyols (A), (B) and (C) and active hydrogen compound (D). Further, with respect to each of the polyols (A), (B) and (C) and active hydrogen compound (D), two or more may be used among polyols, etc. belonging to each category.

[Polyol (A)]

The polyol (A) is a polyol that has a hydroxy value of from 100 to 900 mgKOH/g, obtainable by ring-opening addition of an alkylene oxide to an initiator (S1) that contains no nitrogen atom and has from 2 to 8 functionality, or a polyhydric alcohol that contains no nitrogen atom and has from 2 to 8 functionality and a hydroxy value of from 100 to 900 mgKOH/g.

The polyol (A) contains no nitrogen atom, whereby the compatibility with water is readily suppressed, and good dimensional stability is readily obtainable. If the polyol (A) contains nitrogen atoms, the compatibility with water is improved, whereby although the storage stability of the system liquid may be improved, cells in the obtainable rigid foam tend to be closed-cells, whereby good dimensional stability tends to be hardly obtainable. Therefore, in order to obtain good dimensional stability, as the polyol (A), a polyol or polyhydric alcohol is used that contains no nitrogen atom and has an oxyalkylene group.

One of the polyol (A) is a polyol that has a hydroxy value of from 100 to 900 mgKOH/g, obtainable by ring-opening addition of an alkylene oxide to an initiator (S1) that contains no nitrogen atom and has from 2 to 8 functionality. As the polyol (A), this polyol is more preferred than the after-described polyhydric alcohol.

The initiator (S1) that contains no nitrogen atom, is preferably water or a polyhydric alcohol. Specific examples of the polyhydric alcohol include ethylene glycol, propylene glycol, glycerin, trimethylolpropane, diethylene glycol, diglycerin, pentaerythritol, sorbitol, sucrose, etc. As the initiator (S1), one type may be used alone, or two or more types may be used in combination.

Particularly preferred is at least one member selected from water, ethylene glycol, propylene glycol, glycerin, trimethylolpropane, diglycerin, pentaerythritol, sorbitol and sucrose.

The number of functionality in the initiator (S1) is from 2 to 8, preferably from 2 to 6, particularly preferably from 2 to 5. In the present invention, the number of functionality in an initiator means the number of active hydrogen atoms in the initiator (provided that the number of functionality in water as the initiator (S1) is regarded to be 2). When the number of functionality in the initiator (S1) is at least the lower limit value within the above range, the strength of the obtainable rigid foam tends to be good. When the number of functionality is at most the upper limit value within the above range, the viscosity of the polyol (A) does not tend to be too high, whereby the mixing property of raw materials can easily be secured.

The alkylene oxide to be used for the production of the polyol (A) may, for example, be ethylene oxide, propylene oxide, 1,2-epoxybutane, 2,3-epoxybutane or styrene oxide. Among them, it is preferred to use propylene oxide alone, or to use propylene oxide and a small amount of ethylene oxide in combination. That is, the oxyethylene group content in the polyol (A) is preferably from 0 to 5 mass %, more preferably from 0 to 2 mass %, particularly preferably 0 mass % (i.e. containing no oxyethylene group). The oxyethylene group content in a polyol means a content of the portion derived from ethylene oxide among the alkylene oxide reacted to the initiator. When the oxyethylene group content is at most the upper limit value within the above range, the activity of the polyol (A) does not tend to be too high, and the obtainable rigid foam tends to readily have an open-cell nature, such being desirable.

A known method may be employed as the method for ring-opening addition of an alkylene oxide to the initiator (S1). For example, the ring-opening addition may be carried out in the presence of an alkali metal catalyst. Further, in a case where propylene oxide and ethylene oxide are used in combination, it is preferred that their mixture is subjected to ring-opening addition to the initiator (S1).

The polyhydric alcohol as the polyol (A) is a polyhydric alcohol that contains no nitrogen atom, has from 2 to 8 functionality and has a hydroxy value of from 100 to 900 mgKOH/g. This polyhydric alcohol may be a polyhydric alcohol having an etheric oxygen atom, or a polyhydric alcohol having an oxyalkylene group, so long as it is not one obtainable by ring-opening addition of an alkylene oxide to the initiator (S1). For example, depending upon the difference in the production method, a polypropylene glycol such as tripropylene glycol may be such a polyhydric alcohol or a polyol obtainable by ring-opening addition of an alkylene oxide to the initiator (S1).

The polyhydric alcohol as the polyol (A) is preferably a liquid compound at room temperature. Further, this polyhydric alcohol is preferably used in combination with a polyol obtainable by ring-opening addition of an alkylene oxide to the initiator (S1), as another polyol (A), rather than used alone as the polyol (A). In such a case, the amount of this polyhydric alcohol based on the entire amount of the polyol (A) is preferably at most 50 mass %, particularly preferably from 5 to 30 mass %.

This polyhydric alcohol may, for example, be dipropylene glycol or tripropylene glycol.

The hydroxy value of the polyol (A) is from 100 to 900 mgKOH/g, preferably from 200 to 900 mgKOH/g, particularly preferably from 200 to 850 mgKOH/g. When the hydroxy value is at least the lower limit value within the above range, the viscosity of the polyol (A) does not become too high, such being desirable, and when it is at most the upper limit value within the above range, the rigid foam tends to readily have an open-cell nature, such being desirable.

In the polyol (P), the content of the polyol (A) is from 45 to 80 mass %, preferably from 45 to 70 mass %. When the content of the polyol (A) is at least the lower limit value within the above range, the smoothness of the surface of the foam tends to readily become good during the construction of a polyol system. Further, when the content of the polyol (A) is at most the upper limit value within the above range, the obtainable rigid foam tends to readily have an open-cell nature, whereby the dimensional stability will be good, such being desirable.

[Polyol (B)]

The polyol (B) is a polyol that has a hydroxy value of from 20 to 56 mgKOH/g and a terminal oxyethylene group content of from 5 to 15 mass %, obtainable by ring-opening addition of an alkylene oxide other than ethylene oxide, to an initiator (S2) that contains no nitrogen atom and has from 2 to 8 functionality, followed by ring-opening addition of ethylene oxide.

The initiator (S2) is the same as the initiator (S1) which is used for the above-mentioned production of the polyol (A), including the preferred embodiments.

The alkylene oxide other than ethylene oxide, to be used for the production of the polyol (B), may, for example, be propylene oxide, 1,2-epoxybutane, 2,3-epoxybutane or styrene oxide. Among them, propylene oxide is preferred.

Firstly, by the reaction of the alkylene oxide (other than ethylene oxide) to the initiator (S2), a secondary (or, in some cases, tertiary) hydroxy group is formed at a terminal, and then, ethylene oxide is reacted to the hydroxy group to convert the terminal to be a 2-hydroxyethyl group, whereby the hydroxy group is converted to a primary hydroxy group. The ethylene oxide reacted will form an oxyethylene group or a polyoxyethylene group (i.e. a chain of oxyethylene groups) at the terminal portion excluding the hydroxy group. In the present invention, the terminal oxyethylene group content is the total content of oxyethylene groups and polyoxyethylene groups at such terminal portions.

In the production of the polyol (B), ethylene oxide may be reacted before reacting the alkylene oxide other than ethylene oxide, and then, the alkylene oxide other than ethylene oxide may be reacted. In such a case, an oxyethylene group derived from ethylene oxide is not present at a terminal portion, and accordingly, its content is not included in the calculation of the terminal oxyethylene content. Further, in the production of the polyol (B), a mixture of an alkylene oxide other than ethylene oxide, and a small amount of ethylene oxide, may be reacted. In such a case, the reactivity of ethylene oxide is higher than the reactivity of the alkylene oxide other than ethylene oxide, whereby ethylene oxide tends to react firstly with the initiator, and then, other alkylene oxide tends to react subsequently to form a secondary (or, in some cases, tertiary) hydroxy group. Thus, also in a case where a mixture of ethylene oxide with other alkylene oxide is reacted, an oxyethylene group derived from ethylene oxide in the mixture will not be present at the terminal portion, and accordingly, its content is not included in the calculation of the terminal oxyethylene content.

Even in a case where the amount of ethylene oxide to be reacted last is in a proportion of one molecule per one secondary (or, in some cases, tertiary) hydroxy group of the intermediate polyol, all polyols to be formed may not have primary hydroxy groups. That is, since the reactivity of a primary hydroxy group formed by the reaction of ethylene oxide is high, ethylene oxide to be reacted subsequently tends to preferentially react with such a primary hydroxy group, and the probability of the reaction to an unreacted secondary (or, in some cases, tertiary) hydroxy group decreases. Therefore, in order to increase the proportion of primary hydroxy groups, it is necessary to react more than the equivalent amount of ethylene oxide. Further, thereby, a polyoxyethylene group tends to be formed at a terminal portion.

The terminal oxyethylene group content in the polyol (B) is from 5 to 15 mass %, preferably from 7 to 15 mass %, particularly preferably from 7 to 12 mass %.

When the terminal oxyethylene group content is at least the lower limit within the above range, the storage stability of the polyol system liquid becomes good. When it is at most the upper limit value within the above range, the activity will not be too high, and the obtainable rigid foam tends to have open-cells and will be less susceptible to shrinkage, and a good dimensional stability tends to be readily obtainable.

In a case where oxyethylene groups are present at other than terminal portions, the content of such oxyethylene groups at other than the terminal portions is preferably less than 10 mass %, particularly preferably less than 5 mass %. Further, the total content of such oxyethylene groups at other than terminal portions and terminal oxyethylene groups is preferably at most 15 mass %. Here, the polyol (B) is particularly preferably a polyol wherein oxyethylene groups at other than terminal portions are not present.

A known method may be employed as the method for carrying out ring-opening addition of alkylene oxides to the initiator (S2) in the above order. For example, propylene oxide is subjected to ring-opening addition in the presence of an alkali metal catalyst or a composite metal cyanide catalyst, and then, ethylene oxide is subjected to ring-opening addition in the presence of an alkali metal catalyst.

Further, the hydroxy value of the polyol (B) is from 20 to 56 mgKOH/g, preferably from 20 to 50 mgKOH/g, particularly preferably from 20 to 40 mgKOH/g. When the hydroxy value is at least the lower limit value within the above range, the viscosity of the polyol (B) will not be too high. When it is at most the upper limit value within the above range, the obtainable rigid foam tends to have open-cells, such being desirable.

In the polyol (P), the content of the polyol (B) is from 10 to 40 mass %, preferably from 20 to 40 mass %. When the content f the polyol (B) is at least the lower limit value within the above range, open-cells tend to be readily formed, and the dimensional stability tends to be good. When it is at most the upper limit value within the above range, the storage stability of the polyol system and the surface property of the foam in the practical application tend to be good.

[Polyol (C)]

The polyol (C) is a polyol that has a hydroxy value of from 50 to 350 mgKOH/g, obtainable by ring-opening addition of ethylene oxide and an alkylene oxide other than ethylene oxide, to an initiator (S3) that contains nitrogen atom(s) and has from 3 to 5 functionality, wherein the amount of ethylene oxide based on the entire amount of the alkylene oxide is from 30 to 80 mass %.

When the polyol (C) containing nitrogen atoms is used, the reactivity of the polyol (P) with the polyisocyanate compound will be improved, and in the spraying method wherein a high reactivity is required, a good rigid foam can be produced.

As the initiator (S3) that contains nitrogen atom(s), an amine compound is preferred. As such an amine compound, an amine compound having at least one nitrogen atom having hydrogen atom(s) bonded thereto, or an amine compound having a hydroxy group (which may have a nitrogen atom having hydrogen atom(s) bonded thereto) is preferred. Such an amine compound may, for example, be an aliphatic amine, an alicyclic amine or an aromatic amine, which has a nitrogen atom having hydrogen atom(s) or hydroxy alkyl group(s) bonded thereto. The aliphatic amine may, for example, be an alkylamine such as ethylenediamine, hexamethylenediamine or diethylenetriamine, or an alkanolamine such as monoethanolamine, diethanolamine or triethanolamine. The alicyclic amine may, for example, be aminoethylpiperazine. The aromatic amine may, for example, be diaminotoluene or a Mannich reaction product. The Mannich reaction product is a reaction product of a phenol, an alkanolamine and an aldehyde and may, for example, be a reaction product of nonylphenol, monoethanolamine and formaldehyde.

Particularly in the present invention, water is used as a blowing agent, and in order to improve the affinity with water, an aliphatic or alicyclic amine is preferred.

The number of nitrogen atoms contained in the initiator (S3) may be at least 1, but preferably at least 2, more preferably from 2 to 5, particularly preferably 2 or 3. When the number of nitrogen atoms is at least one, a high reactivity can be obtained.

The number of functionality in the initiator (S3) is from 3 to 5, particularly preferably 3 or 4. When the number of functionality is at least the lower limit value within the above range, the strength of the obtainable rigid foam tends to be good. When it is at most the upper limit value within the above range, the viscosity of the polyol (C) will not be too high, and the mixing property of raw materials tends to be good, such being desirable.

The number of functionality in the initiator (S3) is meant for the number of active hydrogen atoms (the total number of hydrogen atoms bonded to nitrogen atoms and hydrogen atoms of hydroxy groups). Such hydrogen atoms and hydroxy groups are moieties to which an alkylene oxide is reacted, and by the reaction of the alkylene oxide, a hydroxy group is formed. Accordingly, the number of such functionality will be the number of hydroxy groups in the obtainable polyol (C).

Alkylene oxides to be used for the production of the polyol (C) are a combination of ethylene oxide and an alkylene oxide other than ethylene oxide. The alkylene oxide other than ethylene oxide may, for example, be propylene oxide, 1,2-epoxybutane, 2,3-epoxybutane or styrene oxide, particularly preferably propylene oxide.

In the combination of ethylene oxide and an alkylene oxide other than ethylene oxide, when the entire alkylene oxide to be reacted to the initiator (S3) is taken as 100 mass %, the oxyethylene group content is from 30 to 80 mass %, preferably from 40 to 80 mass %, particularly preferably from 40 to 70 mass %. When the amount of ethylene oxide based on the entire alkylene oxide is at least the lower limit value within the above range, the activity of the polyol (C) tends to be high, and spraying with a uniform thickness tends to be easy, such being desirable. When it is at most the upper limit value within the above range, the strength of the obtainable foam can easily be made high, such being desirable.

When the ring-opening addition is carried out by combining ethylene oxide and an alkylene oxide other than ethylene oxide, the two may be separately and sequentially subjected to ring-opening addition, or a mixture of the two may be subjected to ring-opening addition. In a case where ethylene oxide and an alkylene oxide other than ethylene oxide are separately sequentially subjected to ring-opening addition, it is preferred that firstly ethylene oxide is subjected to ring-opening addition and subsequently, an alkylene oxide other than ethylene oxide is subjected to ring-opening addition, whereby the terminal hydroxy group in the obtainable polyol becomes a secondary (or, in some cases, tertiary) hydroxy group in a higher proportion. Also in a case where a mixture of ethylene oxide and an alkylene oxide other than ethylene oxide, is subjected to ring-opening addition, the terminal hydroxy group in the obtainable polyol likewise becomes a secondary (or, in some cases, tertiary) hydroxy group in a higher proportion. It is thereby possible to prevent the activity of the polyol (C) from becoming too high. Particularly preferred is the polyol (C) obtainable by ring-opening addition of ethylene oxide to the initiator (S3), followed by ring-opening addition of an alkylene oxide other than ethylene oxide.

A known method may be employing as the method for ring-opening addition of the alkylene oxide to the initiator (S3). For example, in the case of the initiator (S3) having a hydrogen atom bonded to a nitrogen atom, it is possible to subject the alkylene oxide to ring-opening addition in the absence of a catalyst. Further, to the compound having a hydroxy alkylamino group obtained in the absence of a catalyst or to the initiator (S3) having a hydroxy group, an alkylene oxide may be added by ring-opening addition in the presence of a catalyst such as an alkali metal catalyst.

The hydroxy value of the polyol (C) is from 50 to 350 mgKOH/g, preferably from 100 to 350 mgKOH/g, particularly preferably from 150 to 350 mgKOH/g. When the hydroxy value is at least the lower limit value within the above range, the strength (particularly the compression strength) of the obtained rigid foam tends to be high, such being desirable. When it is at most the upper limit value within the above range, the hydrogen bonding between active hydrogen groups can be suppressed, whereby the viscosity of the obtainable polyol can easily be controlled to be low, and the viscosity when mixed with the polyol (A) and the polyol (B) can easily be controlled to be relatively low. Accordingly, the obtained rigid foam tends to easily form a uniform thermal insulation layer, such being desirable. Further, a proper hydrophobicity can be maintained, whereby a proper affinity with the polyols (A) and (B) tends to be easily obtainable, whereby the storage stability of the liquid component (X) will be good, such being desirable.

In the polyol (P), the content of the polyol (C) is from 5 to 30 mass %, preferably from 10 to 20 mass %. When the content of the polyol (C) is at least the lower limit value within the above range, a high activity is readily obtainable, and particularly in consideration of construction of a roof or ceiling of a house, spraying with a uniform thickness with little sagging will be possible, such being desirable. When it is at most the upper limit value within the above range, the affinity with the polyol (B) can be secured, whereby the storage stability of the polyol system will consequently be good, such being desirable.

Particularly, if the content of the polyol (C) is less than 5 mass %, the activity of the polyol (P) decreases, whereby sagging is likely to occur in the construction of a ceiling, and it becomes difficult to form a uniform thermal insulation layer. If a catalyst is increased to prevent sagging, in the case of an amine catalyst, the odor increases, and in the case of a metal catalyst, environmental pollution will be problematic, and a further increase of costs is likely to be led, such being undesirable.

Particularly, in a case where the content of the polyol (C) is from 5 to 20 mass %, the contents of the polyols (A) and (B) in the polyol (P) are preferably in such ranges that the polyol (A) is from 40 to 60 mass %, and the polyol (B) is from 20 to 40 mass %.

[Active Hydrogen Compound (D)]

The polyol (P) may contain, in addition to the polyols (A), (B) and (C), a compound having an active hydrogen atom reactive with an isocyanate group (i.e. an active hydrogen compound (D)). The compound having an active hydrogen atom may, for example, be a compound having a hydroxy group, a compound having an amino group or a compound having a hydroxy group and an amino group.

Such an active hydrogen compound (D) may, for example, be a polyol not included any category of the polyols (A), (B) and (C), a polyhydric alcohol other than the polyol (A), a polyhydric phenol or a polyether polyamine.

The polyol may, for example, be a polyether polyol, a polyester polyol or a polycarbonate polyol.

The polyhydric phenol may, for example, be a non-condensed compound such as bisphenol A or resorcinol, a resol type primary condensation product having a phenol condensation-bonded to an excessive formaldehyde in the presence of an alkali catalyst, a benzylic type primary condensation product reacted in a non-aqueous system at the time of synthesizing such a resol type primary condensation product, or a novolac type primary condensation product having an excessive phenol reacted to a formaldehyde in the presence of an acid catalyst. The molecular weight of such primary condensation products is preferably from about 200 to 10,000. In the foregoing, the phenol may, for example, be phenol, cresol, bisphenol A or resorcinol. The formaldehyde may, for example, be formalin or paraformaldehyde.

The polyether polyamine is a compound obtainable by converting a hydroxy group of a polyether polyol to an amino group or an amino group-containing organic group. For example, a polyether thiamine having a number average molecular weight of 5,000 and an amination percentage of 95% (tradename: JEFFAMINE T-5000, manufactured by Texaco) obtained by ring-opening addition of propylene oxide to glycerin, followed by aminating hydroxy groups thereof, may be mentioned.

The polyisocyanate compound is reacted with water being a blowing agent in the present invention to form carbon dioxide gas and a polyamine compound. The polyamine compound to be formed is one type of active hydrogen compound and will be reacted with a polyisocyanate compound to become a resin constituent of the rigid foam. However, a polyamine compound to be formed by the reaction of the polyisocyanate compound with water being a blowing agent is not regarded as the above-mentioned active hydrogen compound (D) in the present invention, because this polyamine compound is not a component to be incorporated to the liquid component (X).

The total amount of the polyols (A), (B) and (C) in the polyol (P) is preferably from 90 to 100 mass %. That is, the content of the active hydrogen compound (D) is preferably from 0 to 10 mass %. A preferred composition of the polyol (P) comprises from 45 to 70 mass % of the polyol (A), from 30 to 40 mass % of the polyol (B), from 10 to 25 mass % of the polyol (C) and from 0 to 10 mass % of the active hydrogen compound (D). When the polyol (P) has such a composition, the storage stability of the polyol system liquid for spraying, using only water as a blowing agent, is good, and a foam excellent in the dimensional stability will be obtained. Further, it is possible to form a thermal insulation layer with good processability and little sagging. Especially, it is preferred not to use a polyester polyol which is commonly used as an active hydrogen compound (D) for the rigid foam.

[Blowing Agent]

The blowing agent in the present invention is a component to form a foam by a foaming action by a gas. Since a rigid foam to be formed is an open-cell foam, the gas in cells of the formed rigid foam will be gradually diffused and replaced with the ambient gas such as air.

In the present invention, water is used as the blowing agent. Together with water, as the case requires, a low boiling point hydrocarbon compound, a low boiling point fluorinated compound or an inert gas may, for example, be used in combination.

When water is used, the obtainable rigid foam tends to have open-cells. Accordingly, it is preferred to use only water or to use water and an inert gas in combination, and it is particularly preferred to use only water in that the load to environment is thereby small.

Further, as mentioned above, water is reacted with a polyisocyanate compound of the liquid component (Y) to form carbon dioxide gas, and by the foaming action of the carbon dioxide thereby formed, a rigid foam will be formed. A blowing agent other than water is not reacted with a polyisocyanate compound, and it forms a rigid foam by the foaming action by gasification of itself.

The above-mentioned low boiling hydrocarbon compound may, for example, be butane, pentane, hexane or cyclohexane. The above-mentioned low boiling point fluorinated compound may, for example, be, 1,1,1,2-tetrafluoroethane (HFC-134a), 1,1,1,3,3-pentafluoropropane (HFC-245fa) or 1,1,1,3,3-pentafluorobutane (HFC-365mfc). Further, the above-mentioned inert gas may, for example, be air, nitrogen or carbon dioxide gas. One of them may be used alone, or two or more of them may be used in combination.

The present invention is particularly suitable and provides excellent effects in a system wherein a large amount of a blowing agent is used for weight reduction and water is used in a large amount as the blowing agent.

Specifically, it is possible to produce a rigid foam well by a spraying method even in a case where the amount of water as a blowing agent is as much as from 15 to 30 parts by mass per 100 parts by mass of the polyol (P). When the amount of water is at least 15 parts by mass, the obtained rigid foam can be easily made to be light in weight, and if it is at most 30 parts by mass, good mixing between water and the polyol compound can easily be attained. The amount of water is particularly preferably from 16 to 25 parts by mass.

[Catalyst]

The catalyst to be used in the present invention is not particularly limited so long as it is a catalyst to promote the urethane-forming reaction. It may, for example, be an amine type catalyst such as N,N,N',N'',N''-pentamethyldiethylenetriamine, bis(2-dimethylaminoethyl) ether, triethylenediamine or N,N,N',N'-tetramethylhexamethylenediamine; a reactive amine type catalyst such as N,N,N'-trimethylaminoethylethanolamine; or an organic metal type catalyst such as dibutyltin dilaurate. Further, a catalyst to promote a trimerization reaction of an isocyanate group may be used in combination, and as such a catalyst, a carboxylic acid metal salt such as potassium acetate or potassium 2-ethylhexanoate may, for example, be mentioned. The amount of the catalyst to be used is preferably from 0.1 to 15 parts by mass, per 100 parts by mass of the polyol (P).

Further, as the catalyst, it is preferred to use only an amine type catalyst or a reactive amine type catalyst without using a metal catalyst in order to avoid a problem of environmental pollution. In the present invention, even when an amine type catalyst which is usually said to have an activity lower than a metal catalyst, is used, the initial reactivity is good, and it is possible to obtain a uniform rigid foam layer with little sagging.

[Surfactant]

In the present invention, a surfactant is used to form good cells. Such a surfactant may, for example, be a silicone type surfactant or a fluorinated compound type surfactant. Not only a silicone type surfactant which is commonly used for the production of a rigid urethane foam, but also a silicone type surfactant to be used for the production of a highly air permeable flexible urethane foam, may be used. The amount of the surfactant may suitably be selected, and it is usually preferably from 0.1 to 10 parts by mass per 100 parts by mass of the polyol (P).

[Other Additives]

In the present invention, it is preferred to use a flame retardant. As described hereinafter, in a case where the isocyanate index is low, the flammability of the obtainable rigid foam tends to be high. Accordingly, for such a rigid foam, it is preferred to lower the flammability by incorporating a flame retardant. Further, a rigid foam to be used for thermal insulation of a building, etc., is basically essential to be a foam having low flammability. Accordingly, in the production of a rigid foam to be used for such an application, it is preferred to incorporate a flame retardant.

The amount of the flame retardant is preferably from 10 to 100 parts by mass, more preferably from 10 to 80 parts by mass, particularly preferably from 20 to 60 parts by mass, per 100 parts by mass of the polyol (P). When the amount of the flame retardant is at least the lower limit value within the above range, the flame retardancy of the foam will be well improved. When it is at most the upper limit value within the above range, the storage stability of the polyol system liquid will be well maintained.

As such a flame retardant, a phosphorus type flame retardant is preferred, and as a compound, tricresyl phosphate (TCP), triethyl phosphate (TEP), tris($\beta$-chloroethyl) phosphate (TCEP) or tris($\beta$-chloropropyl) phosphate (TCPP) may, for example, be preferred.

In the present invention, it is possible to incorporate, other than the above-described flame retardant, optional additives to the liquid component (X). Such additives may, for example, be a filler such as calcium carbonate or barium sulfate; an anti-aging agent such as an antioxidant or an ultraviolet absorber; a plasticizer, a colorant, an antifungal agent, a cell opener, a dispersing agent, a discoloration preventing agent, etc. As mentioned above, additives not reactive with an isocyanate group, among these additives, may be incorporated to the liquid component (Y). However, a polyisocyanate compound usually has a high viscosity as compared with a polyol, and if such additives are incorporated to the liquid component (Y), the viscosity of the liquid component (Y) may further increase. It is preferred that the viscosity of the liquid component (X) and the viscosity of the liquid component (Y) are close to each other. By bringing the viscosities of the two components to be close to each other, it becomes easy to uniformly mix the two components by the spraying method, and it becomes easy to constantly maintain the blend ratio with time. Therefore, the additives are usually incorporated to the liquid component (X).

[Liquid Component (Y)]

The liquid component (Y) in the present invention is a liquid component which comprises a polyisocyanate compound and is usually composed solely of a polyisocyanate compound.

The polyisocyanate compound is not particularly limited, but is preferably an aromatic, alicyclic or aliphatic polyisocyanate having at least two isocyanate groups; a mixture of two or more such polyisocyanates; or a modified polyisocyanate obtainable by modifying them.

Specifically, it may, for example, be a polyisocyanate such as tolylene diisocyanate (TDI), diphenylmethane diisocyanate (MDI), polymethylenepolyphenyl polyisocyanate (crude MDI), xylylene diisocyanate (XDI), isophorone diisocyanate (IPDI) or hexamethylene diisocyanate (HDI) or a prepolymer type modified product, nurate modified product, urea modified product or carbodiimide modified product thereof. Among them, TDI, MDI, crude MDI or a modified product thereof is preferred. Crude MDI is particularly preferred from the viewpoint of availability and handling efficiency.

[Spraying Method]

The spraying method in the present invention is a method for forming a liquid mixture of the liquid component (X) and the liquid component (Y) on a substrate, such as a method wherein the liquid component (X) and the liquid component (Y) are jetted from nozzles in fine liquid droplets, respectively, so that both liquid droplets are mixed in air and sprayed onto a substrate, or a method wherein the liquid component (X) and the liquid component (Y) are mixed in a mixing head, and the liquid mixture is immediately jetted from a nozzle of the mixing head in the form of liquid droplets and sprayed onto a substrate. The liquid mixture of the liquid components (X) and (Y) formed on the substrate is readily reacted, foamed and cured to form a rigid foam. Various methods are known as the spraying method. However, as the spraying method in the present invention, a so-called airless spraying method is preferred wherein the liquid components (X) and (Y) are mixed in a mixing head and then sprayed.

The mixing ratio of the liquid components (X) and (Y) is adjusted by an isocyanate index. The isocyanate index is 100 times the number of isocyanate groups in the compound contained in the liquid component (Y) to the total number of active hydrogen atoms in the compounds contained in the liquid component (X). In other words, the isocyanate index is the number of equivalents of the polyisocyanate compound contained in the liquid component (Y) to 100 equivalents of the total of the compounds contained in the liquid component (X). The majority of the compounds having active hydrogen atoms contained in the liquid component (X) is the above polyol (P) and water as the blowing agent. In some cases, a surfactant or other additives may contain active hydrogen atoms, but the number of such active hydrogen atoms is relatively small and is usually negligible. The compound having an isocyanate group contained in the liquid component (Y) is the above-mentioned polyisocyanate compound.

In the present invention, the isocyanate index showing the blend ratio of the liquid component (Y) to the liquid component (X) is preferably from 20 to 100, more preferably from 30 to 80, particularly preferably from 40 to 70. When the isocyanate index is at least 20, open-cells will be readily formed, and when it is at most 100, weight reduction may easily be accomplished.

In a case where the isocyanate index is at most 100, substantially all of isocyanate groups will be reacted with active hydrogen atoms of compounds (such as polyols, water, etc.) having active hydrogen, to form urethane bonds or urea bonds. Further, as mentioned above, by the reaction of an isocyanate group with water as a blowing agent, an isocyanate group is converted to an amino group, and this amino group will be reacted with an isocyanate group to form a urea bond.

When a rigid foam is to be produced, the isocyanate index may sometimes be adjusted to be a numerical value exceeding 100 (for example 120), so that excess isocyanate groups are trimerized to form isocyanurate bonds. A rigid foam having such isocyanurate bonds has low flammability (i.e. hardly flammable). However, in a case where the isocyanate index is not more than 100, the flammability of the rigid foam to be formed tends to be high (i.e. flammable) and such a rigid foam is hardly useful in its applications. Therefore, in the present invention, in a case where a rigid foam is produced with an isocyanate index being at most 100, it is usually inevitable to use the above-mentioned flame retardant.

Further, the blend ratio of the liquid component (X) to the liquid component (Y) is preferably made to be about 1:1 by volume ratio within the above-mentioned range of the isocyanate index. By adjusting the volume ratio to be substantially 1:1, it becomes easy to uniformly mix both components by the spraying method in the same manner as to bring the viscosities of the respective components to be close to each other, and it becomes easy to constantly maintain the blend ratio with time.

Adjustment to make the volume ratio to be substantially 1:1 may be carried out by various methods. For example, it is possible to lower the volume ratio by lowering the isocyanate index within the above-mentioned range of the isocyanate index so that the blend ratio (mass ratio) of the liquid component (Y) decreases. Further, by increasing the average hydroxy value of the entire polyol (P), it is possible to lower the volume ratio of the liquid component (X), since the blend ratio (mass ratio) of the polyol (P) to the liquid component (Y) decreases even when the isocyanate index is constant.

The rigid foam to be produced by the present invention is preferably light in weight. Specifically, it is preferred to produce a rigid foam by a spraying method, by using the liquid component (X) and the liquid component (Y), so that the core density of the rigid foam will be from 5 to 25 kg/m³ when produced by simple foaming. It is more preferred to use the liquid component (X) and the liquid component (Y) so that the core density of the rigid foam will be from 5 to 20 kg/m³ when produced by simple foaming, and it is particularly preferred to use the liquid component (X) and the liquid component (Y) so that the core density will be from 7 to 15 kg/m³.

The spraying method is a method for producing a rigid foam directly at a construction site and thus has merits such that the construction cost can be reduced, and the application can be made without empty spaces even on a surface with irregularities, of the substrate. Therefore, it is used in many cases for forming a thermal insulation layer made of a rigid foam on a surface of e.g. walls, ceilings, base portions or underfloors of buildings such as houses, apartment buildings, condominium buildings, office buildings, prefabricated cold storage warehouses, etc. Further, before constructing a building, a rigid foam may preliminarily be formed by the spraying method on a building material, and a building may be constructed by using this building material having the rigid foam layer preliminarily formed thereon. Further, the rigid foam to be produced by the present invention is not one limited to an application as a thermal insulation material for buildings or building materials.

The rigid foam of the present invention can easily be made to be light in weight and thus is particularly preferable for application to buildings or building materials. Further, even in a case where a rigid foam is produced by adjusting the above-mentioned isocyanate index to be at most 100, by incorporating a flame retardant, it is possible to form a flame retardant rigid foam which is useful for application to buildings or building materials.

According to the present invention, a rigid open-cell foam can be produced by a spraying method wherein water is mainly or solely used as the blowing agent. In spite of using water in a large amount, it is possible not only to obtain good storage stability of the liquid component (X) but also a good mixing property of the liquid components (X) and (Y), and weight reduction is possible even by using water in a large amount. The cells in the obtainable rigid foam are fine and free from roughening of cells due to e.g. defoaming; formation of depression can be suppressed; and excellent dimensional stability and good strength can be obtained. Further, the surface property of the rigid foam which is important in the spraying method, is good, and it is possible to obtain a surface excellent in smoothness without irregularities. Further, without sagging at the time of the application to a ceiling, it is possible to form a uniform rigid foam layer.

EXAMPLES

Now, the present invention will be described in further detail with reference to Examples, but it should be understood that the present invention is by no means limited to such specific Examples.

The hydroxy value was measured in accordance with JIS K1557 (1970 edition).

The viscosity was measured in accordance with JIS K1557 (1970 edition).

Examples and Comparative Examples

Rigid foams were produced by formulations as shown in Tables 1, 2-1 and 2-2. Examples 1 to 7 are Working Examples of the present invention, and Examples 8 to 16 are Comparative Examples. In the Tables, the unit for the numerical values representing incorporated amounts is parts by mass.

The raw materials used in Examples and Comparative Examples are as follows.

[Polyol (P)]

Polyol A1: A polyol having a hydroxy value of 240 mgKOH/g, obtained by using glycerin as an initiator and reacting only propylene oxide as an alkylene oxide thereto.

Polyol A2: A polyol having a hydroxy value of 400 mgKOH/g, obtained by using glycerin as an initiator and reacting only propylene oxide as an alkylene oxide thereto.

Polyol A3: Dipropylene glycol, and its hydroxy value is 836 mgKOH/g.

Polyol A4: Tripropylene glycol, and its hydroxy value is 584 mgKOH/g.

Polyol B1: A polyol having a hydroxy value of 34 mgKOH/g and a terminal oxyethylene group content of 14 mass %, obtained by using glycerin as an initiator and reacting propylene oxide as an alkylene oxide and thereafter reacting ethylene oxide.

Polyol B2: A polyol having a hydroxy value of 34 mgKOH/g and a terminal oxyethylene group content of 10 mass %, obtained by using glycerin as an initiator and reacting propylene oxide as an alkylene oxide and thereafter reacting ethylene oxide.

Polyol B3: A polyol having a hydroxy value of 26 mgKOH/g and a terminal oxyethylene group content of 15 mass %, obtained by using glycerin as an initiator and reacting propylene oxide as an alkylene oxide and thereafter reacting ethylene oxide.

Polyol B4: A polyol having a hydroxy value of 24 mgKOH/g and a terminal oxyethylene group content of 14 mass %, obtained by using glycerin as an initiator and reacting propylene oxide as an alkylene oxide and thereafter reacting ethylene oxide.

Polyol B5: A polyol having a hydroxy value of 34 mgKOH/g, obtained by using glycerin as an initiator and reacting propylene oxide as an alkylene oxide.

Polyol B6: A polyol having a hydroxy value of 34 mgKOH/g and a terminal oxyethylene group content of 4 mass %, obtained by using glycerin as an initiator and reacting propylene oxide as an alkylene oxide and thereafter reacting ethylene oxide.

Polyol B7: A polyol having a hydroxy value of 34 mgKOH/g and a terminal oxyethylene group content of 16 mass %, obtained by using glycerin as an initiator and reacting propylene oxide as an alkylene oxide and thereafter reacting ethylene oxide.

Polyol B8: A polyol having a hydroxy value of 34 mgKOH/g and a terminal oxyethylene group content of 45 mass %, obtained by using glycerin as an initiator and reacting propylene oxide as an alkylene oxide and thereafter reacting ethylene oxide.

Polyol C1: A polyol having a hydroxy value of 240 mgKOH/g, obtained by using 1-(2-Aminoethyl)piperazine as an initiator and reacting ethylene oxide and propylene oxide as alkylene oxides in this order. The mass ratio of ethylene oxide to propylene oxide reacted (ethylene oxide/propylene oxide) is 50/50.

Polyol C2: A polyol having a hydroxy value of 200 mgKOH/g, obtained by using 1-(2-Aminoethyl)piperazine as an initiator and reacting ethylene oxide and propylene oxide as alkylene oxides in this order. The mass ratio of ethylene oxide to propylene oxide reacted (ethylene oxide/propylene oxide) is 60/40.

Polyol C3: A polyol having a hydroxy value of 350 mgKOH/g, obtained by using 1-(2-Aminoethyl)piperazine as an initiator and reacting ethylene oxide and propylene oxide as alkylene oxides in this order. The mass ratio of ethylene oxide to propylene oxide reacted (ethylene oxide/propylene oxide) is 50/50.

Polyol C4: A polyol having a hydroxy value of 400 mgKOH/g, obtained by using 1-(2-Aminoethyl)piperazine as an initiator and reacting ethylene oxide and propylene oxide as alkylene oxides in this order. The mass ratio of ethylene oxide to propylene oxide reacted (ethylene oxide/propylene oxide) is 50/50.

Polyol C5: A polyol having a hydroxy value of 350 mgKOH/g, obtained by using 1-(2-Aminoethyl)piperazine as an initiator and reacting only ethylene oxide as an alkylene oxide.

Polyol C6: A polyol having a hydroxy value of 300 mgKOH/g, obtained by using 1-(2-Aminoethyl)piperazine as an initiator and reacting only propylene oxide as an alkylene oxide.

Polyol C7: A polyol having a hydroxy value of 300 mgKOH/g, obtained by using ethylenediamine as an initiator and reacting ethylene oxide and propylene oxide as alkylene oxides in this order. The mass ratio of ethylene oxide to propylene oxide reacted (ethylene oxide/propylene oxide) is 50/50.

Polyol C8: A polyol having a hydroxy value of 300 mgKOH/g, obtained by using ethylenediamine as an initiator and reacting only ethylene oxide as an alkylene oxide.

Polyol C9: A polyol having a hydroxy value of 300 mgKOH/g, obtained by using ethylenediamine as an initiator and reacting only propylene oxide as an alkylene oxide.

[Polyisocyanate Compound]

CORONATE 1130: Crude MDI, viscosity: 101 mPa·s, NCO content: 31.2% (manufactured by Nippon Polyurethane Industry Co., Ltd.)

[Flame Retardant]

Tris(β-chloropropyl) phosphate (tradename: FYLOL PCF, manufactured by ICL-IP JAPAN)

[Surfactant]

Silicone type surfactant (tradename: SF2938F, manufactured by Dow Corning Toray Co., Ltd.)

[Catalyst]

Catalyst A: An amino alcohol type catalyst (tradename: TOYOCAT RX7, manufactured by TOSOH CORPORATION)

Catalyst B: Bis(dimethylaminoethyl) ether 70% solution (dipropylene glycol: 30%) (tradename: TOYOCAT ET, manufactured by TOSOH CORPORATION)

[Blowing Agent]

Water

<Production by Simple Foaming, and Evaluation>

By formulations as shown in Tables 1, 2-1 and 2-2, the blowing agent (water), the surfactant, the catalyst and the flame retardant were added and mixed to the polyol (P) (the total being 100 parts by mass) to obtain a polyol system liquid.

30 g of the polyol system liquid thus prepared, and 34.8 g of the polyisocyanate compound were put together in a cup of 500 cm$^3$ at a liquid temperature of 15° C. and stirred for 2 seconds at a rotational speed of 3,000 rpm by a stirring device having stirring vanes provided on a drilling machine, and thereby foamed and then, put into a wood box of 200×200×200 mm with the top opened, to produce a rigid foam. The hydroxy value and the isocyanate index of the polyol (P) are shown in Tables 1, 2-1 and 2-2.

The following evaluations were carried out. The results are shown in Tables 1, 2-1 and 2-2.

[Cream Time and Rise Time]

As an evaluation of the reactivity, by taking the time for initiation of mixing the polyol system liquid and the polyisocyanate compound as 0 second, the time until a color change starts and foaming is initiated, was measured as a cream time. Further, the time until the rising of the foam by foaming stops from the time for initiation of the mixing was visually measured as a rise time (unit: seconds).

[Density]

From a core portion of an obtained foam, a cube of 100 mm on one side was cut out, and the density was measured in accordance with JIS K7222. With respect to one having a large shrinkage deformation, the measurement of the density was impossible, and such one was identified with "measurement impossible" in the Tables.

[Shrinkage]

For the evaluation of shrinkage, after termination of the rising of the foam by foaming, the foam was left to stand at 20° C. for 30 minutes, whereupon the appearance was observed. One having no deformation was represented by ○ (good), and one having a shrinkage deformation was represented by x (no good).

<System Storage Stability>

The above polyol system liquid was stored at 20° C. for 1 month and observed. The evaluation was made on such a basis that when any one of separation, precipitation and solidification was observed, the system solution was evaluated to be x (no good), and when none of them was observed, the system liquid was evaluated to be ○ (good).

<Production by Spraying Method, and Evaluation>

A rigid foam was produced by a method wherein the same polyol system liquid (i.e. liquid component (X)) and polyisocyanate compound (i.e. liquid component (Y)) as in the production by simple foaming, were sprayed and applied to a flexible board of 600 mm×600 mm×5 mm vertically installed to simulate a wall surface, by means of a spray foaming machine, at a liquid temperature of 40° C. at a room temperature of 20° C. in a volume ratio 1:1. As the spray foaming machine, MODEL N-16000E-HYD foaming machine manufactured by NUE Corporation, having D gun manufactured by Gusmer Corporation connected, was used.

In the following evaluations, one wherein the measurement was impossible due to a shrinkage deformation of the foam, was indicated as "measurement impossible" in the Tables.

In Examples 10 to 14 wherein the evaluation of the system storage stability was x (no good), the evaluation by the spraying method was not carried out.

[Density]

On the day after the application, the core portion was cut out in a rectangular parallelopiped of 200 mm×200 mm×25 mm, and the density was measured in accordance with JIS K7220.

[Surface property]

In a case where the surface irregularities of the rigid foam are so large that convex portions are too high, the rigid foam may not be accommodated within a wall of a house, and it is necessary to cut off the convex portions. On the other hand, if concave portions are large, the thickness deviation tends to be large, and fluctuation is like to occur in the thermal insulation performance, and therefore, spraying is again applied, and the thickness is adjusted by cutting it again to a thickness which may be accommodated within the wall. Accordingly, in the spraying method, it is necessary that the surface can be processed to be smooth in order to prevent an increase of the amount of the raw materials to be used and to avoid a cumbersome processing and in order to carry out the operation efficiently. As the surface property, the maximum value of the difference in height of bumps constituting the surface irregularities after the spraying was measured and confirmed by a caliper manufactured by Mitsutoyo Corporation, and the surface property was evaluated by the following three grades.

3: A state wherein no bumpy irregularities are observed, and the surface is very smooth.

2: A state wherein bumpy irregularities are slightly or partially observed, and smoothness is slightly lost. The maximum value of the difference in height of bumps is less than 10 mm, or the total area where bumps are present is less than 900 cm².

1: A state wherein bumpy irregularities are large or observed over the entire surface, and the smoothness is completely lost. The maximum value of the difference in height of bumps is at least 10 mm, or the total area where bumps are present is at least 900 cm².

[Sagging Degree]

To simulate a roof surface of a house, the application was made onto the lower surface of a plywood of 600 mm in length×300 mm in width installed at an inclination of 45° as an intermediate between a wall surface and a top surface. A convex portion constituting the maximum thickness and a concave portion constituting the minimum thickness on the surface of a foam were measured, and their difference is shown. One with the difference being at most 20 mm was regarded as good (unit: mm).

[Dimensional Stability]

A high temperature high humidity shrinkage (unit: %) was measured in accordance with ASTM D2126. That is, a core portion was cut out in a rectangular parallelopiped of 100 mm×100 mm×40 mm, and the dimension ($T_1$) in a vertical direction to the foaming direction (usually vertical to the substrate surface) was measured, and after expiration of 24 hours in an environment at a temperature of 70° C. under a relatively humidity of 95%, the dimension ($T_2$) in the vertical direction to the foaming direction was measured, whereupon 100 times the value obtained by dividing the dimensional change ($T_2$-$T_1$) by $T_1$ was taken as a dimensional change ratio.

[Volume Percentage of Closed Cells]

The volume percentage of closed cells (unit: %) was measured in accordance with ASTM D6226. A core portion was cut out in a cube of 25 mm×25 mm×25 mm, and the length, width and height were measured by a caliper (manufactured by Mitsutoyo Corporation, and an apparent volume was measured. Further, the true volume was measured by a gas phase substitution method by means of a true volume-measuring apparatus (VM-100 model, manufactured by ESTECH Corporation). A value obtained by dividing the true volume by the apparent volume was shown by a percentage (unit: %).

[Thermal Conductivity]

The thermal conductivity (unit: W/m·k) was measured in accordance with JIS A1412 by means of a thermal conductivity-measuring apparatus (product name: AUTOΛ HC-074 model, EKO INSTRUMENTS CO., Ltd.).

TABLE 1

| | | Ex. 1 | Ex. 2 | Ex. 3 | Ex. 4 | Ex. 5 | Ex. 6 | Ex. 7 |
|---|---|---|---|---|---|---|---|---|
| Polyol system liquid | Polyol A1 | 50 | 35 | 35 | 50 | 80 | 45 | 45 |
| | Polyol A2 | | 15 | 5 | | | | |
| | Polyol A3 | | | 10 | | | | |
| | Polyol B2 | 35 | 35 | | 35 | | 25 | 40 |
| | Polyol B3 | | | 35 | | 15 | | |
| | Polyol C1 | 15 | | | | | | |
| | Polyol C2 | | 15 | | | | 5 | |
| | Polyol C3 | | | | 15 | | | |
| | Polyol C7 | | | 15 | | | 30 | 15 |
| | Water | 18 | 18 | 18 | 18 | 18 | 18 | 18 |
| | Flame retardant | 50 | 50 | 50 | 50 | 50 | 50 | 50 |
| | Surfactant | 4 | 4 | 4 | 4 | 4 | 4 | 4 |
| | Catalyst A | 10 | 10 | 10 | 10 | 10 | 10 | 10 |
| | Catalyst B | 1 | 1 | 1 | 1 | 1 | 1 | 1 |
| Isocyanate index | | 68 | 67 | 65 | 67 | 67 | 67 | 68 |
| Hydroxy value of polyol (P) [mgKOH/g] | | 173 | 192 | 243 | 190 | 206 | 207 | 176 |

TABLE 1-continued

|  |  | Ex. 1 | Ex. 2 | Ex. 3 | Ex. 4 | Ex. 5 | Ex. 6 | Ex. 7 |
|---|---|---|---|---|---|---|---|---|
| Simple foaming | Cream time [sec] | 4 | 4 | 4 | 4 | 5 | 4 | 4 |
|  | Rise time [sec] | 13 | 13 | 14 | 14 | 15 | 12 | 12 |
|  | Density [kg/m$^3$] | 12.8 | 12.9 | 12.8 | 12.8 | 12.6 | 12.2 | 12.1 |
|  | Shrinkage evaluation | ○ | ○ | ○ | ○ | ○ | ○ | ○ |
| System storage stability |  | ○ | ○ | ○ | ○ | ○ | ○ | ○ |
| Spraying method | Density [kg/m$^3$] | 14.8 | 15.3 | 15.1 | 15.2 | 15.7 | 14.2 | 14.4 |
|  | Surface property | 3 | 3 | 3 | 3 | 3 | 3 | 3 |
|  | Sagging degree [mm] | 9 | 7 | 6 | 4 | 11 | 4 | 6 |
|  | Dimensional stability [%] | −0.5 | −0.4 | −0.8 | −0.9 | −0.3 | −0.3 | −0.4 |
|  | Volume percentage of closed cells [%] | 2.8 | 3.5 | 1.3 | 3.3 | 3.3 | 3.8 | 2.8 |
|  | Thermal conductivity [W/m · K] | 0.035 | 0.035 | 0.036 | 0.036 | 0.037 | 0.036 | 0.036 |

TABLE 2-1

|  |  | Ex. 8 | Ex. 9 | Ex. 10 | Ex. 11 | Ex. 12 |
|---|---|---|---|---|---|---|
| Polyol system liquid | Polyol A1 | 35 | 35 | 50 | 55 | 35 |
|  | Polyol A2 | 15 | 15 |  |  |  |
|  | Polyol A3 |  |  |  |  |  |
|  | Polyol A4 |  |  |  |  | 25 |
|  | Polyol B1 |  |  |  |  | 35 |
|  | Polyol B2 | 35 |  | 35 |  |  |
|  | Polyol B3 |  | 35 |  |  |  |
|  | Polyol B4 |  |  |  | 40 |  |
|  | Polyol B5 |  |  |  |  |  |
|  | Polyol B6 |  |  |  |  |  |
|  | Polyol B7 |  |  |  |  |  |
|  | Polyol B8 |  |  |  |  |  |
|  | Polyol C1 |  |  |  |  |  |
|  | Polyol C4 |  |  | 15 |  |  |
|  | Polyol C5 |  |  |  |  | 5 |
|  | Polyol C6 | 15 |  |  |  |  |
|  | Polyol C7 |  |  |  |  |  |
|  | Polyol C8 |  |  |  | 5 |  |
|  | Polyol C9 |  | 15 |  |  |  |
|  | Water | 18 | 18 | 18 | 18 | 18 |
|  | Flame retardant | 50 | 50 | 50 | 50 | 50 |
|  | Surfactant | 4 | 4 | 4 | 4 | 4 |
|  | Catalyst A | 10 | 10 | 10 | 10 | 10 |
|  | Catalyst B | 1 | 1 | 1 | 1 | 1 |
| Isocyanate index |  | 67 | 67 | 67 | 69 | 65 |
| Hydroxy value of polyol (P) [mgKOH/g] |  | 207 | 199 | 197 | 158 | 246 |
| Simple foaming | Cream time [sec] | 6 | 6 | 4 | 4 | 5 |
|  | Rise time [sec] | 15 | 16 | 14 | 14 | 15 |
|  | Density [kg/m$^3$] | 13.1 | 13.2 | 12.8 | 12.8 | 14.3 |
|  | Shrinkage evaluation | ○ | ○ | ○ | ○ | ○ |
| System storage stability |  | ○ | ○ | X | X | X |
| Spraying method | Density [kg/m$^3$] | 15.3 | 15.1 | — | — | — |
|  | Surface property | 3 | 3 | — | — | — |
|  | Sagging degree [mm] | 25 | 30 | — | — | — |
|  | Dimensional stability [%] | −0.8 | −0.2 | — | — | — |
|  | Volume percentage of closed cells [%] | 1.6 | 1.4 | — | — | — |
|  | Thermal conductivity [W/m · K] | 0.036 | 0.036 | — | — | — |

TABLE 2-2

|  |  | Ex. 13 | Ex. 14 | Ex. 15 | Ex. 16 |
|---|---|---|---|---|---|
| Polyol system liquid | Polyol A1 | 50 | 40 | 50 | 40 |
|  | Polyol A2 |  |  |  |  |
|  | Polyol A3 |  | 10 |  | 10 |
|  | Polyol A4 |  |  |  |  |
|  | Polyol B1 |  |  |  |  |
|  | Polyol B2 |  |  |  |  |
|  | Polyol B3 |  |  |  |  |

TABLE 2-2-continued

|  |  | Ex. 13 | Ex. 14 | Ex. 15 | Ex. 16 |
|---|---|---|---|---|---|
|  | Polyol B4 |  |  |  |  |
|  | Polyol B5 | 35 |  |  |  |
|  | Polyol B6 |  | 35 |  |  |
|  | Polyol B7 |  |  | 35 |  |
|  | Polyol B8 |  |  |  | 35 |
|  | Polyol C1 | 15 | 15 |  |  |
|  | Polyol C4 |  |  |  |  |
|  | Polyol C5 |  |  |  |  |
|  | Polyol C6 |  |  |  |  |
|  | Polyol C7 |  |  | 15 | 15 |
|  | Polyol C8 |  |  |  |  |
|  | Polyol C9 |  |  |  |  |
|  | Water | 18 | 18 | 18 | 18 |
|  | Flame retardant | 50 | 50 | 50 | 50 |
|  | Surfactant | 4 | 4 | 4 | 4 |
|  | Catalyst A | 10 | 10 | 10 | 10 |
|  | Catalyst B | 1 | 1 | 1 | 1 |
| Isocyanate index |  | 69 | 66 | 68 | 65 |
| Hydroxy value of polyol (P) [mgKOH/g] |  | 162 | 222 | 174 | 235 |
| Simple foaming | Cream time [sec] | 4 | 4 | 4 | 4 |
|  | Rise time [sec] | 13 | 14 | 13 | 14 |
|  | Density [kg/m$^3$] | 12.9 | 12.8 | Measurement impossible | Measurement impossible |
|  | Shrinkage evaluation | ○ | ○ | X | X |
| System storage stability |  | X | X | ○ | ○ |
| Spraying method | Density [kg/m$^3$] | — | — | Measurement impossible | Measurement impossible |
|  | Surface property | — | — | 3 | 3 |
|  | Sagging degree [mm] | — | — | 8 | 8 |
|  | Dimensional stability [%] | — | — | Measurement impossible | Measurement impossible |
|  | Volume percentage of closed cells [%] | — | — | Measurement impossible | Measurement impossible |
|  | Thermal conductivity [W/m · K] | — | — | Measurement impossible | Measurement impossible |

From the results shown in Tables 1, 2-1 and 2-2, it was found that in Examples 1 to 7 of the present invention, the storage stability of the polyol system liquid was good, and the surface property and dimensional stability which are important in the spraying method, were good and also the evaluation of the sagging or shrinkage was good.

Whereas, in Examples 8 and 9, an oxyethylene group was not contained in the polyol (C), whereby particularly the initial reactivity was poor, and the sagging degree was large.

Further in each of Examples wherein, as polyol (C), polyol C4 (Example 10) having a hydroxy value of 400 mgKOH/g was used, and polyol C5 (Example 11) and polyol C8 (Example 12) wherein the alkylene oxide was ethylene oxide only, were used, the system storage stability deteriorated.

In Examples wherein as polyol (B), polyol B5 (Example 13) containing no terminal oxyethylene group or polyol B6 (Example 14) having a small terminal oxyethylene group content, was used, the storage stability of the liquid component (X) was poor.

Examples 15 and 16 are examples wherein no polyol (B) was contained, and instead, polyol B7 or B8 having a large terminal oxyethylene group content, was used. Although the storage stability was good, the foam underwent shrinkage, when left to stand at 20° C. (normal temperature) after simple foaming. Further, also in the spraying method, even from immediately after the spraying, the shrinkage of the foam was large, and the dimensional stability was so poor that the measurement was impossible.

INDUSTRIAL APPLICABILITY

According to the present invention, the storage stability of the liquid component (X) (polyol system liquid) containing water in a large amount, becomes good. Further, it is possible to produce a rigid open-cell foam even by complete water foaming wherein only water is used as a blowing agent in the spraying method. The obtainable rigid foam is light in weight, excellent in the surface appearance and cell structure, and suitable for application to buildings or building materials. Particularly, it is suitable as a thermal insulating material for a surface such as a ceiling where sagging is likely to occur. At the same time, it is possible to reduce the load on global environment, since a metal catalyst or a blowing agent having a large warming coefficient is not used.

This application is a continuation of PCT Application No. PCT/JP2010/072679, filed Dec. 16, 2010, which is based upon and claims the benefit of priority from Japanese Patent Application No. 2009-287661 filed on Dec. 18, 2009. The contents of those applications are incorporated herein by reference in its entirety.

What is claimed is:

1. A process for producing a rigid open-cell foam, which comprises mixing and spraying onto a substrate, by a spraying method, a liquid component (X) which comprises a polyol (P), a blowing agent, a surfactant and a catalyst, and a liquid component (Y) which comprises a polyisocyanate compound, and subjecting the mixture on the substrate to foaming and a reaction for curing, wherein
the polyol (P) comprises the following polyols (A), (B) and (C), and based on the entire amount of the polyol (P), the content of the polyol (A) is from 45 to 80 mass %, the content of the polyol (B) is from 10 to 40 mass %, the content of the polyol (C) is from 5 to 30 mass %, and the total content of the polyols (A), (B) and (C) is from 90 to 100 mass %, and the blowing agent comprises water, polyol (A): a polyol that has a hydroxy value of from 100 to 900 mgKOH/g, obtained by ring-opening addition of an alkylene oxide to an initiator (S1) that contains no nitrogen atom and has from 2 to 8 functionality, or a polyhydric alcohol that contains no nitrogen atom and has from 2 to 8 functionality and a hydroxy value of from 100 to 900 mgKOH/g, polyol (B): a polyol that has a hydroxy value of from 20 to 56 mgKOH/g and a terminal oxyethylene group content of from 5 to 15 mass %, obtained by ring-opening addition of an alkylene oxide other than ethylene oxide, to an initiator (S2) that contains no nitrogen atom and has from 2 to 8 functionality, followed by ring-opening addition of ethylene oxide, polyol (C): a polyol that has a hydroxy value of from 50 to 350 mgKOH/g, obtained by ring-opening addition of ethylene oxide and an alkylene oxide other than ethylene oxide, to an initiator (S3) that contains nitrogen atom(s) and has from 3 to 5 functionality, wherein the amount of ethylene oxide based on the entire amount of the alkylene oxide is from 30 to 80 mass %.

2. The process for producing a rigid open-cell foam according to claim 1, wherein the liquid components (X) and (Y) are mixed in such a ratio that the isocyanate index becomes from 20 to 100.

3. The process for producing a rigid open-cell foam according to claim 1, wherein the liquid component (X) further contains a flame retardant.

4. The process for producing a rigid open-cell foam according to claim 1, wherein the amount of the water is from 15 to 30 parts by mass per 100 parts by mass of the polyol (P).

5. The process for producing a rigid open-cell foam according to claim 1, wherein as the blowing agent, only water is used.

6. The process for producing a rigid open-cell foam according to claim 1, wherein the initiator (S3) is a compound that contains at least two nitrogen atoms.

7. The process for producing a rigid open-cell foam according to claim 1, wherein the initiator (S3) is an amine compound.

8. The process for producing a rigid open-cell foam according to claim 1, wherein the polyol (C) is a polyol obtained by ring-opening addition of ethylene oxide to the initiator (S3), followed by ring-opening addition of an alkylene oxide other than ethylene oxide.

9. The process for producing a rigid open-cell foam according to claim 1, wherein the polyol (A) has an oxyethylene group content of from 0 to 5 mass %.

10. The process for producing a rigid open-cell foam according to claim 1, wherein the alkylene oxide of the polyol (A), and the alkylene oxide other than ethylene oxide of the polyols (B) and (C) is propylene oxide each.

11. The process for producing a rigid open-cell foam according to claim 1, wherein the closed-cell percentage of the rigid foam is at most 10%.

12. The process for producing a rigid open-cell foam according to claim 1, wherein the substrate is a building or a building material.

13. The process for producing a rigid open-cell foam according to claim 1, wherein based on the entire amount of the polyol (P), the content of the polyol (A) is from 45 to 70 mass %, the content of the polyol (B) is from 20 to 40 mass %, the content of the polyol (C) is from 10 to 20 mass %, and the total content of the polyols (A), (B) and (C) is from 90 to 100 mass %.

14. The process for producing a rigid open-cell foam according to claim 1, wherein polyol (A) has a hydroxy value of from 200 to 850 mgKOH/g, and initiator (S1) or the polyhydric alcohol has from 2 to 5 functionality.

15. The process for producing a rigid open-cell foam according to claim 1, wherein polyol (B) has a hydroxy value of from 20 to 40 mgKOH/g and a terminal oxyethylene group content of from 7 to 12 mass %.

16. The process for producing a rigid open-cell foam according to claim 1, wherein polyol (C) has a hydroxy value of from 150 to 350 mgKOH/g, initiator (S3) has 3 to 4 functionality, and the amount of ethylene oxide based on the entire amount of the alkylene oxide is from 40 to 70 mass %.

* * * * *